US005738317A

United States Patent [19]

Hugron

[11] Patent Number: 5,738,317

[45] Date of Patent: Apr. 14, 1998

[54] RESILIENT SIGNALLING POST ASSEMBLY

[76] Inventor: Denis Hugron, 1855, rue George, St-Hubert (Québec), Canada, J4T 1W2

[21] Appl. No.: 531,757

[22] Filed: Sep. 21, 1995

[51] Int. Cl.[6] .......... F16M 11/00; G09F 15/00

[52] U.S. Cl. .......... 248/176.1; 248/122.1; 248/219.3; 40/607; 40/606; 40/610

[58] Field of Search .......... 248/176.1, 122.1, 248/160, 158, 407, 218.4, 219.2, 219.1, 219.3; 40/607, 606, 608, 610, 612

[56] References Cited

U.S. PATENT DOCUMENTS

| | | | |
|---|---|---|---|
| 4,019,271 | 4/1977 | Latimer | 40/612 |
| 4,209,927 | 7/1980 | Donatelle | 40/607 |
| 4,327,514 | 5/1982 | Bourque | 40/607 |
| 4,408,407 | 10/1983 | Bloom et al. | 40/607 |
| 4,524,533 | 6/1985 | Still, Jr. | 40/610 |
| 4,592,158 | 6/1986 | Seely | 40/603 |
| 4,742,633 | 5/1988 | Snediker | 40/607 |
| 5,160,111 | 11/1992 | Hugron | 248/548 |
| 5,199,814 | 4/1993 | Clark et al. | 40/608 |
| 5,273,371 | 12/1993 | Hugron | 404/10 |
| 5,472,162 | 12/1995 | Mason | 248/219.2 |

*Primary Examiner*—Ramon O. Ramirez
*Assistant Examiner*—Anita M. King
*Attorney, Agent, or Firm*—François Martineau

[57] ABSTRACT

The road sign post assembly comprises a tubular hollow post, having a bottom portion and a top rim circumscribing a mouth; a ground base, engaged by the post bottom portion for supportingly biasing the post in upright position over ground. A closure cap has a tubular section sized to fit into the top mouth of the post in a closed condition thereof. A seat is carried by the post rim for supporting a pair of rigid cross-bars forming an open road sign support frame, radially outwardly from the post. The closure cap is hinged to the post top end, includes an integral outer abutment lip, cooperating with the seat in the cap closed condition, and a locking pin extending through an annular transverse lip of the cap and through the post rim, for preventing accidental release of the road sign support frame from the post.

7 Claims, 6 Drawing Sheets

RESILIENT SIGNALLING POST ASSEMBLY

FIELD OF THE INVENTION

This invention relates to a structure for mounting a cross-member sign support on top of a flexible sign post.

BACKGROUND OF THE INVENTION

U.S. Pat. No 5,231,778 issued 3 Aug. 1993 to *The Dicke Tool Company* (joint inventors: Todd BELOBRAYDICH & Jeffrey WILLIAMS), shows a road sign which has a sign post which has a pair of U-shaped receiving members for receiving a cross-member sign support. A spring-loaded pin secures the sign support in the receiving members.

U.S. Pat. No 4,742,633 issued 10 May 1988 to the *Chicago Show Printing Company* (inventor: Robert SNEDIKER), shows a sing which has a post, which has a vertical slot for receiving the sign board therein, and a top cap for securing the sign in a slot.

U.S. Pat. No 4,592,158 issued 3 Jun. 1986 to *Marketing Displays, Inc.* (inventor: James SEALY) shows a road sign which has a post with a flexible portion, and which has a bracket for holding a cross-member sign support. The bracket has U-shaped channel spaces for holding the sign support, and a latching member, for securing the sign support in the channel spaces.

U.S. Pat. No 4,209,927 issued 1 Jul. 1980 to *Spanjer Brothers, Inc.* (inventor: Leo DONATELLE), shows a sign post which has a pair of posts. Each post has a U-shaped slot for receiving the sign. The sign is secured in the slots by top caps on each post.

OBJECT OF THE INVENTION

An important object of the invention is to provide a road sign post assembly of improved convenience in use, while remaining very compact when not in use.

SUMMARY OF THE INVENTION

In accordance with the objects of the invention, there is disclosed a road sign post assembly comprising: (a) a tubular post member, having a bottom portion, a top rim circumscribing a mouth, and an inner hollow accessed by said mouth for storing a rigid road sign support frame in a folded condition; (b) a ground base member, engaged by said post member bottom portion and supporting said post member in generally upright position over ground; (c) a closure cap member, having an integral tubular section sized to fit into said top mouth of the post member in a closed condition thereof for closing said inner hollow; and (d) seat means, carried by said post member rim for releasably supporting said a rigid road sign support frame in extended condition radially outwardly from said post member; wherein said closure cap member includes an integrals abutment member, cooperating with said seat means in said cap member closed condition for preventing accidental release of said road sign support frame from said post member.

Preferably, mounting means are provided for mounting said closure cap member to said post member top rim for relative movement of said cap member between an open position, axially clearing said mouth, to a closed position, sealing said mouth. These mounting means could include a pair of parallel hinge ears, integrally dependent from said post rim at a location opposite said seat U-shape members and radially outwardly projecting therefrom, a pivot axle interconnecting said hinge ears, and a hinge leg integrally projecting from said closure cap member at a location opposite said abutment lip and pivotally journalled to said pivot axle.

Advantageously, said seat means includes a pair of upwardly opening U-shape members, transversely registering with one another, said U-shape members sized to receive and support a horizontally extending frame part from said road sign support frame. Said abutment means could consist of a rigid lip member, located opposite said mounting means and projecting outwardly from said closure cap member, said lip member flatly abutting against said horizontally extending frame part from said road sign support frame in said closed condition of said cap member.

Locking means could be further added, for releasably interlocking said closure cap member and said post member rim in said closed condition of the cap member.

The invention is also directed to the combination of the road sign support frame and the road sign post assembly.

DETAILED DESCRIPTION OF THE DRAWINGS

Figure 3:
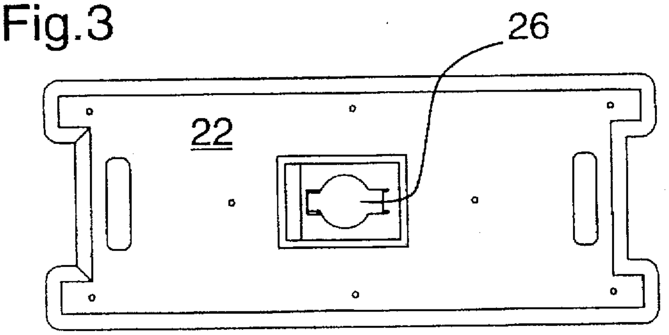
FIG. 3 is a top plan view of the signalling post assembly of FIG. 2.
Figure 1:
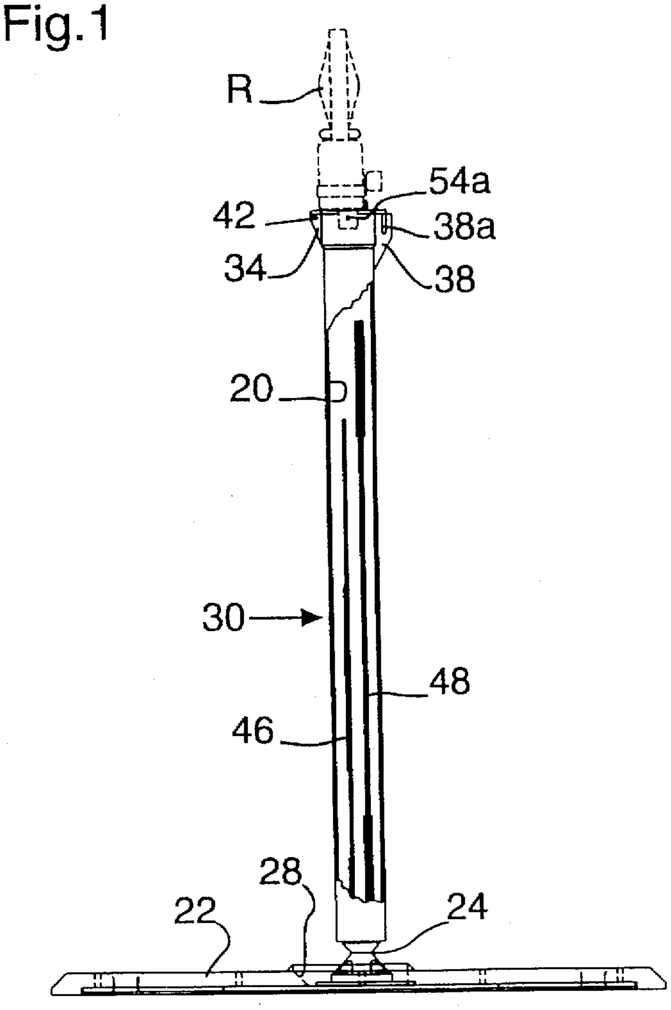
FIGS. 1 and 2 are side and front elevational views respectively of a resilient signalling post assembly according to the invention, shown supporting a top discoid light reflector illustrated in phantom lines, with the post of FIG. 1 being partly broken to show a folded pair of cross-bars from a road sign support frame being stored inside the hollow of the upright post.
Figure 2:
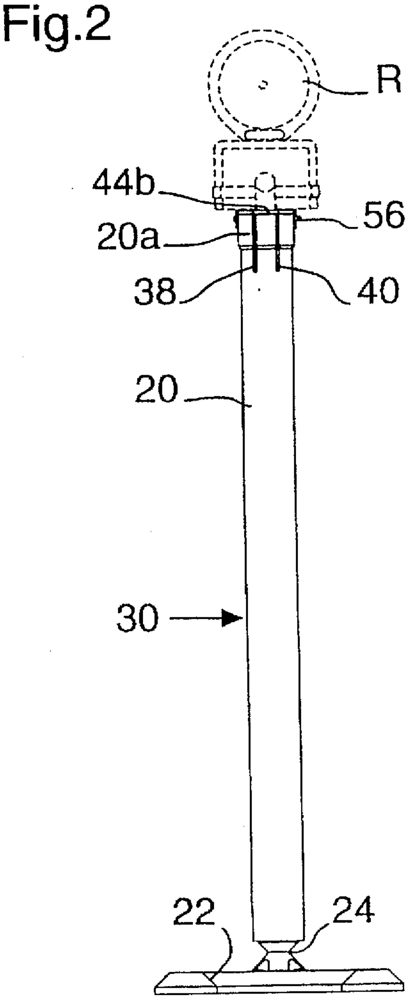

Signalling post assembly illustrated in FIGS. 1–3 includes a number of elements from the signalling post assemblies disclosed in various United States patents issued recently to the present inventor:

U.S. Pat. No. 5,215,400 issued 1 Jun. 1993; and

U.S. Pat. No. 5,273,371 issued 28 Dec. 1993.

The signalling post 30 comprises a main tubular member 20 mounted on a flexible base member 22, by a pivotal mounting means 24. Mounting means 24 may preferably have a memory for returning to its original upright shape upon sustaining a transverse impact. This memory allows the flexible tubular member to maintain a substantially rigid shape and to return to its original shape if slightly deformed upon excessive impact. Moreover, there is also provided tilt biasing means (not illustrated), as generally disclosed in said U.S. Pat. No 5,273,371 to the present inventor, to bias post 30 in upright position while enabling temporary lateral tilt yieldingly under a transverse impact.

The base member 22 is preferably of the quick disconnect type, defining a central socket assembly 26 with a C-shape bracket 28 as generally disclosed in U.S. Pat. No 5,215,400 also to the present inventor. Base member 22 should be of a high density material, to maintain road sign post 30 in fixed position over ground simply by the large weight of the base member, without ground anchoring means being required.

FIGS. 9 to 14 show the upper part of the upright tubular post. Hollow post 30 includes a top annular rim portion 20*a* circumscribing a circular mouth 32. The hollow of tubular post 30 forms a storage area, for storing elongated frame elements 46, 48 (see FIG. 1), rolls of flexible sheet panels F (see FIG. 4), and the like narrow but elongated structures. Rim portion 20*a* carries two pairs of opposite, radially outwardly extending ears 34, 36, and 38, 40. Ears 34 and 36 are parallel to each other, and are interconnected by a pin 42 extending horizontally through the gap 43 therebetween. Pin 42 forms a hinge that pivotally carry the hinge leg 44*a* of a closure cap 44. Ears 38 and 40 are parallel to each other, and each includes an upwardly opening notch 38*a*, 40*a*, to thus form a U-shape member. Notches 38*a*, 40*a*, transversely register and are sized to releasably receive and edgewisely support an elongated, cross-sectionally rectangular, horizontally extending cross-plate 46, spacedly from the wall of cylindrical post 30. Moreover, ears 38 and 40 define a gap 47 therebetween sized to releasably receive another elongated, cross-sectionally rectangular, vertically extending cross-plate 48, with cross-plates 46 and 48 being pivotally interconnected at their respective intermediate sections by a pivot pin 50 (see FIGS. 4 and 7). Vertical cross-plate 48 is located radially outwardly from horizontal cross-plate 46, relative to cylindrical post 30; with cross-plate 46 extending generally tangentially to cylindrical post 30, while cross-plate 48 extends generally parallel to the longitudinal axis of upright post 30.

Closure cap 44 includes a discoid flat base 52, from which radially projects two opposite quadrangular legs 44*a* and 44*b*. From flat base 52 further transversely projects an annular member 54, sized to slidingly fit into mouth 32 and within upright post top rim 20*a*, as suggested by the phantom lines in FIG. 14, when cap 44 is brought to its closed condition. Moreover, in the closed condition of closure cap 44, leg 44*b* flatly abuts horizontally against the top flat edges 38*b*, 40*b*, of post ears 38, 40, and its radial length is such as to positively overlie the top edge 46*a* of horizontal cross-bar 46. Annular member 54 includes a pair of opposite coaxial bores 54*a*, 54*b*, and post top rim 20*a* includes a pair of opposite coaxial bores 30*aa*, 30*ab*, wherein bores 54*a*, 54*b*, 20*aa*, 20*ab*, form complementary bores transversely engageable by a locking pin 56 in the closed condition of the closure cap 44. Pin 56 may be conveniently attached to post rim 20*a* by a loose tie-band 58 anchored to post 30 by a screw 60.

Hence, when locking pin 56 interlocks closed closure cap 44 to the post 30, the cap outer rigid lip 44*b* positively prevents release of cross-bar 46 from the U-shape members notches 38*a*, 40*a*; wherein cross-bar assembly 46, 48, becomes locked to the post 30.

FIGS. 2 to 8 suggest how various road signs can be fitted to the present ground post 30.

In FIGS. 2 and 3, a discoid light reflector R is shown standing over the closure cap 52, and anchored thereto by (conventional) lateral brackets engaging the two free opposite ends of the locking pin 56.

Figure 4:
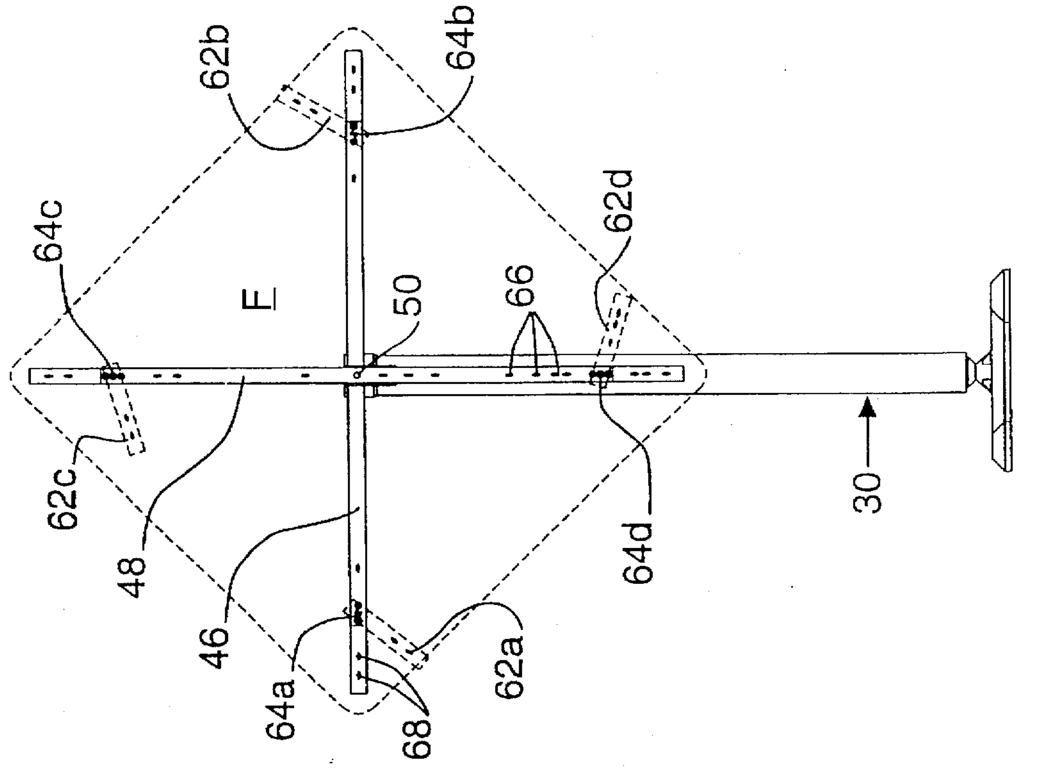
FIGS. 4 to 8 are additional front elevational views of the resilient signalling post assembly, with the adjustable length cross-bars of the road sign support frame being extended into a cross-shape open frame of adjustable size, and shown supporting various roadside light reflecting panels of varying sizes and shapes, wherein FIG. 4 pertains to a flexible road sign sheet panel, and FIGS. 5 to 8 pertain to rigid road sign sheet panels, with FIGS. 6, 7 and 8 being characterized in that the road signs support frame include a third cross-bar.

FIG. 4 shows how cross-bars 46 and 48 can support an extended flexible sheet panel F, with transverse lateral tabs 62*a*, 62*b*, 62*c*, 62*d*, pivoted at 64*a*, 64*b*, 64*c*, 64*d*, respectively, to the respective end portions of each of the two opposite ends of the cross-bars 46 and 48. Each cross-bar 46, 48, includes a number of lengthwisely spaced bores 66, 68, for lengthwise adjustment of the position of the pivot axles 64*a*–64*d*, and to receive and retain conventional road sign attachment brackets, to fit flexible road sign panels of various sizes and shapes.

Figure 5:
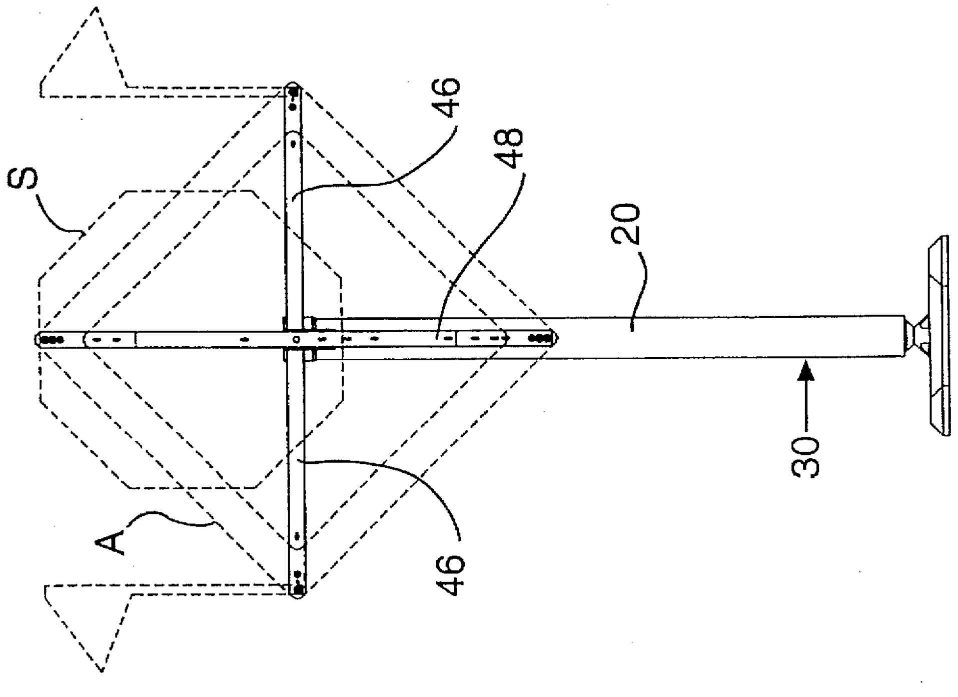

FIG. 5 shows how rigid road sign panels, namely a stop sign S and a road maintenance alert sign A, can be mounted to the cross-bars 46 and 48. Tabs 62*a*, 62*b* and 64*a*, 64*b*, can be attached to the end tips of the cross-bars 46 and 48, as illustrated, to extend this effective length of the cross-bars.

Figure 8:
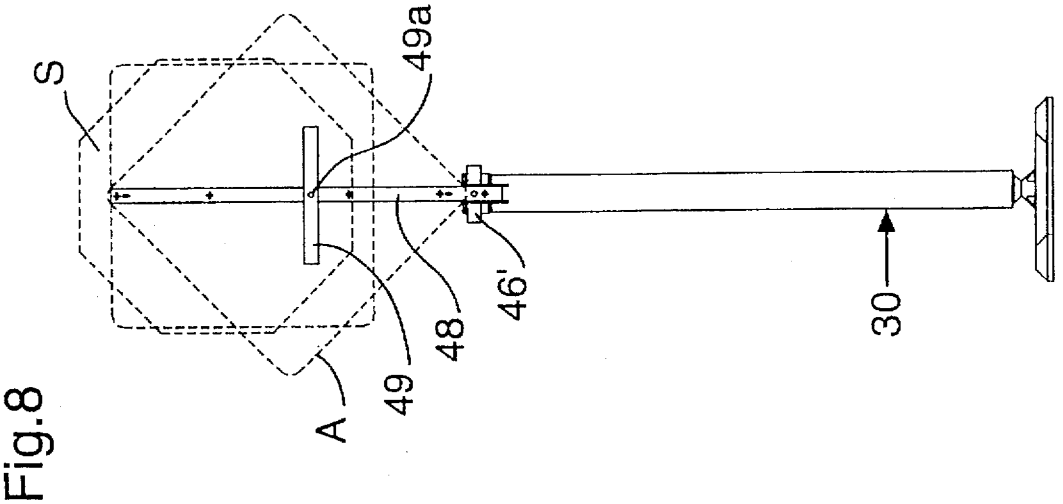
Figure 7:
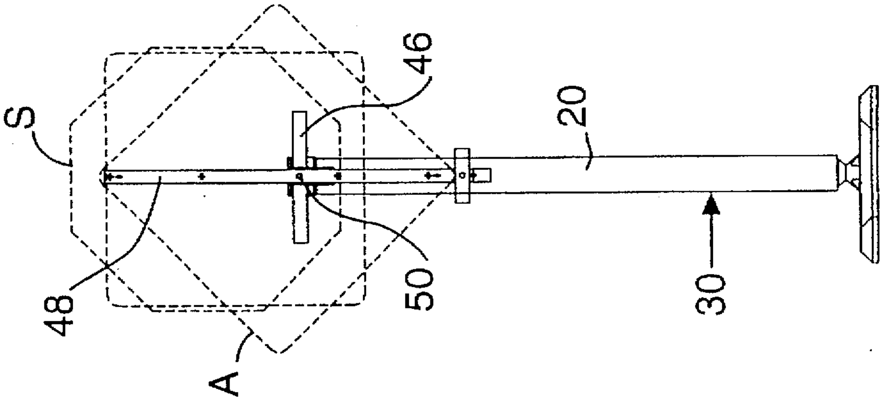
Figure 6:
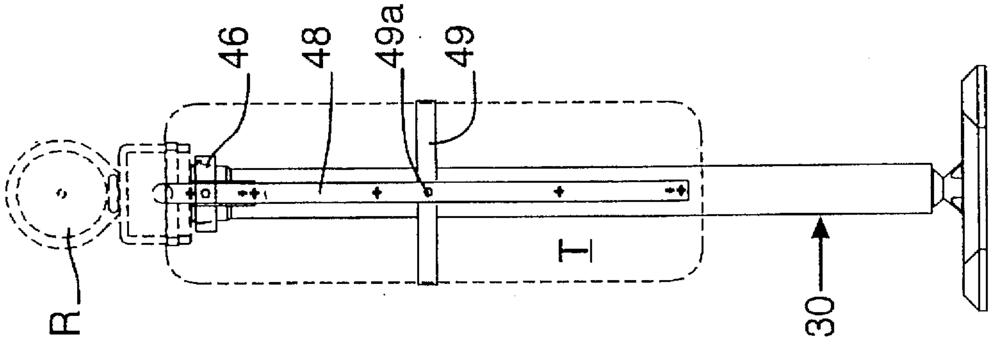
Figure 11:
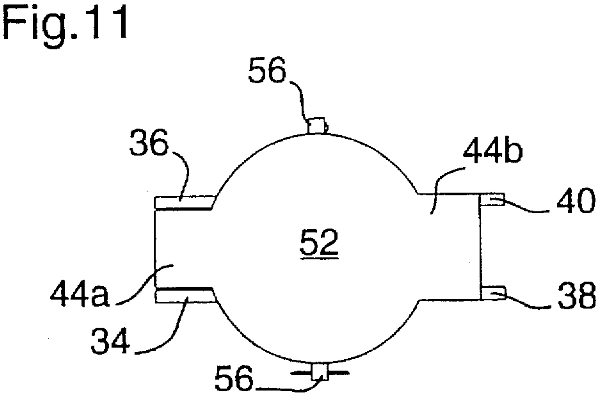
FIG. 11 is a top end view of the post element of FIG. 9.
Figure 9:
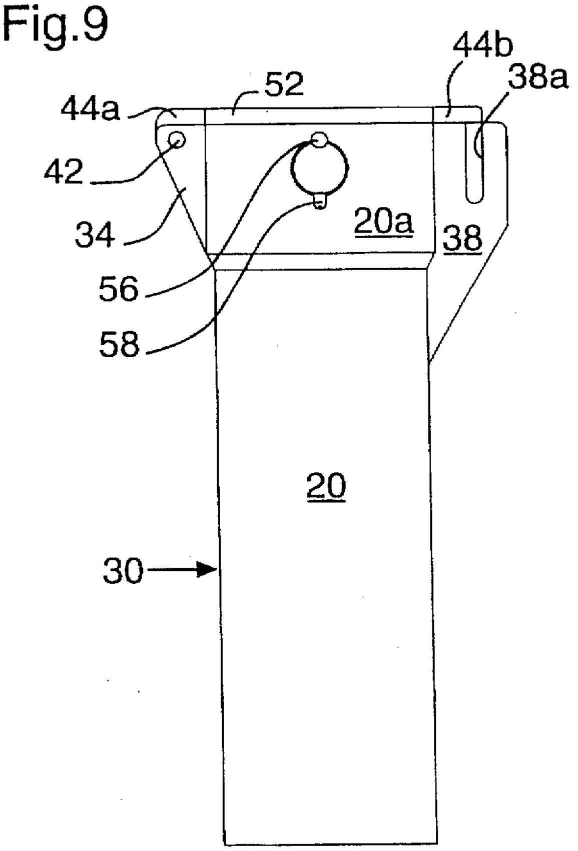
FIGS. 9 and 10 are side and front elevational views respectively of the upper portion of the post element part of the signalling post assembly, with the closure cap in its closed condition.
Figure 10:
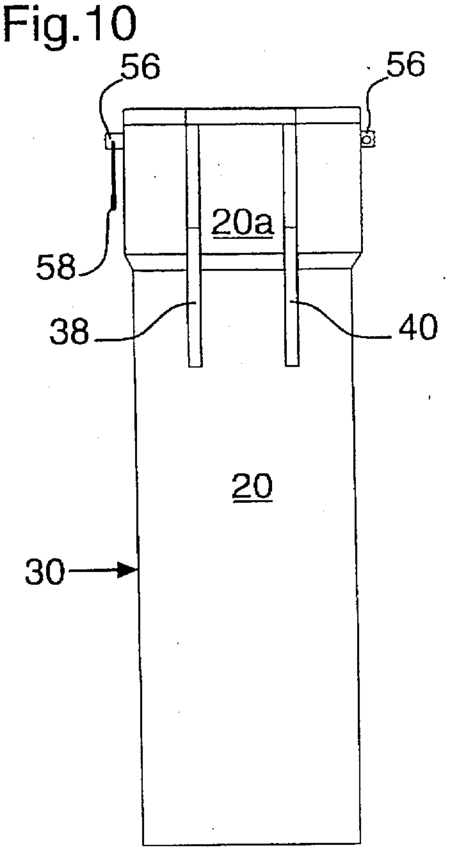
Figure 12:
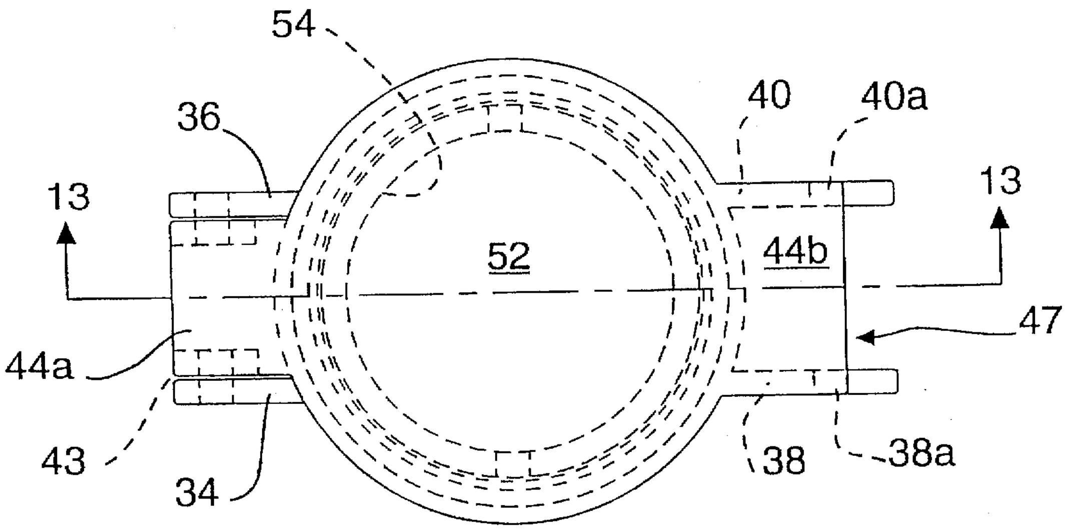
FIG. 12 is a plan view of the inner face of the closure cap mounted to the top end of the post element of FIG. 9.
Figure 13:
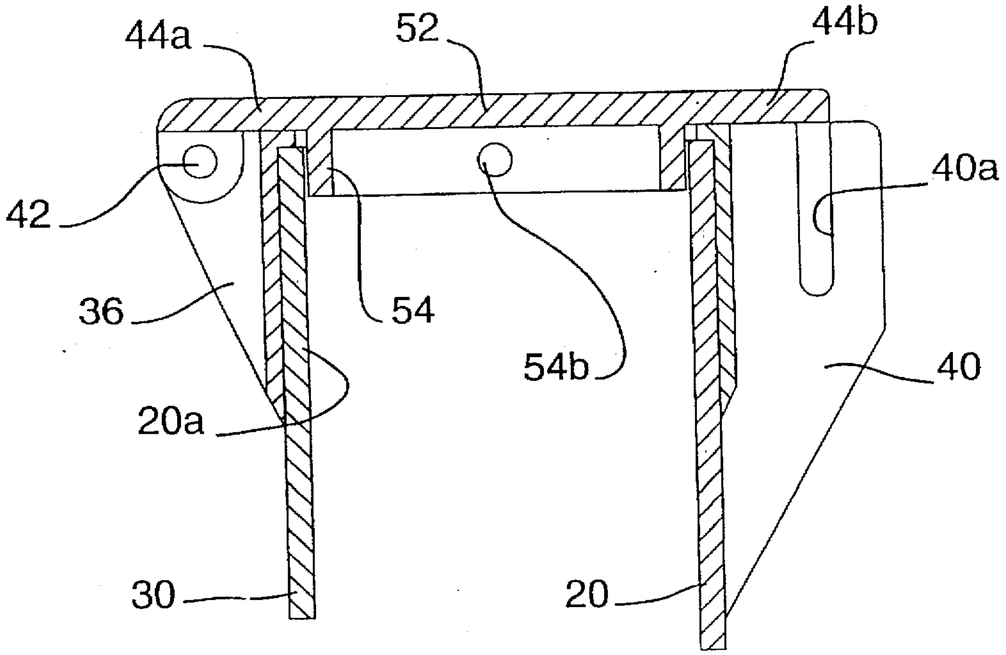
FIG. 13 is a sectional view of the closure cap in closed condition, taken along line 13—13 of FIG. 12.
Figure 14:
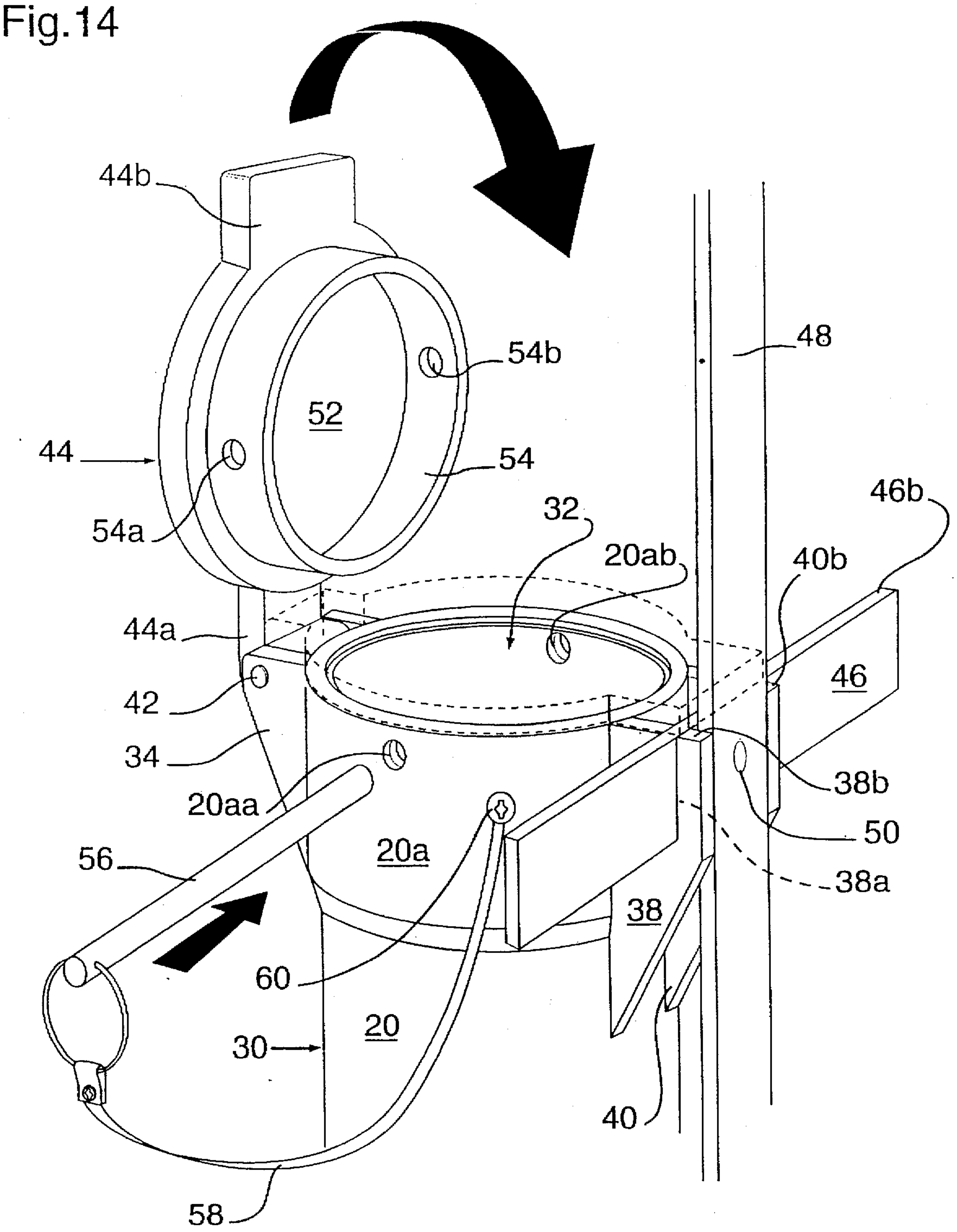
FIG. 14 is an isometric view at an enlarged scale of the top portion of the signalling post assembly of FIG. 5, suggesting by the bold arcuate arrow how the closure cap can releasably close the mouth of the post top end while concurrently locking the cross-member in position within the mouth ears.

FIG. 6 is similar to FIGS. 2 and 3, but with an additional rectangular rigid road sign panel being anchored against post 30 beneath the light reflector R. A third cross-bar 49 is then pivotally mounted at 49*a* in horizontal condition to an intermediate section of vertical cross-bar 48, beneath horizontal cross bar 46. FIGS. 7 and 8 are similar to FIG. 6, but without the light reflector R and with the rigid panels A or S being raised at a higher level, with third horizontal cross-bar 46 being shorter in FIG. 7 and located at the bottom end of vertical cross-bar 48, beneath cross-bar 46, while cross-bar 49 is located in FIG. 8 intermediately of vertical cross-bar 48 above shorter horizontal cross-bar 46'.

The embodiments of the invention for which an exclusive property or privilege is claimed, are defined as follows,

I claim:

1. A road sign post assembly comprising:

(a) a tubular post member, having a bottom portion, a top rim circumscribing a mouth, and an inner hollow accessed by said mouth for storing a rigid road sign support frame in a folded condition;

(b) a ground base member, engaged by said post member bottom portion and supporting said post member in generally upright position over ground;

(c) a closure cap member, having an integral tubular section sized to fit into the top mouth of the post member in a closed condition thereof for closing said inner hollow; and (d) seat means for releasably supporting said rigid road sign support frame in extended condition radially outwardly from said post member and carried by said top rim;

wherein said closure cap member includes an integral abutment member, cooperating with said seat means in said cap member closed condition for preventing accidental release of said road sign support frame from said post member; further including mounting means for mounting said closure cap member to said post member top rim for relative movement of said cap member between an open position, axially clearing the post member mouth, to a closed position, sealing the mouth;

wherein said seat means includes a pair of upwardly opening U-shape members, transversely registering with one another, said U-shape members sized to receive and support a horizontally extending frame part from said road sign support frame.

2. A road sign post assembly as defined in claim 1, wherein said abutment member consists of a rigid lip member, located opposite said mounting means and projecting outwardly from said closure cap member, said lip member adapted to flatly abut against said horizontally extending frame part from said road sign support frame in said closed condition of said cap member.

3. A road sign post assembly as defined in claim 1, further including locking means, releasably interlocking said closure cap member and said top rim in said closed condition of the cap member.

4. A road sign post assembly as defined in claim 2, further including locking means, releasably interlocking said closure cap member and said top rim in said closed condition of the cap member.

5. A road sign post assembly as defined in claim 4, wherein said mounting means includes a pair of parallel hinge ears, integrally dependent from said post rim at a location opposite said U-shape members and radially outwardly projecting therefrom, a pivot axle interconnecting said hinge ears, and a hinge leg integrally projecting from said closure cap member at a location opposite said abutment lip and pivotally journalled to said pivot axle.

6. A road sign post assembly as defined in claim 5, wherein said closure cap member includes a main flat body, from which project in opposite directions and in coplanar fashion said hinge leg and said rigid lip member, with said integral tubular section forming an annular flange transversely depending from said main flat body integrally therewith; and wherein said locking means consists of an elongated locking pin, extending through registering bores in said post member rim and in said annular flange when said closure cap is in its said closed condition.

7. In combination, an open support frame for supporting a road sign, and a post assembly for supporting said support frame over ground; said support frame including at least two elongated rigid frame elements, mounting means for mounting said at least two rigid frame elements to one another for relative movement between a folded inoperative condition and an extended operative condition, and bracket means for releasably securing a road sign panel member to said support frame;

wherein said post assembly comprises:

(a) a tubular post member, having a bottom portion, a top rim circumscribing a mouth, and an inner hollow accessed by the mouth for storing said support frame in its said folded inoperative condition;

(b) a ground base member, engaged by said post member bottom portion and supporting said post member in generally upright position over ground;

(c) a closure cap member, having an integral tubular section sized to fit into the top mouth of the post member in a closed condition thereof for closing said inner hollow; and (d) a support member, carried by said post member rim and releasably supporting said rigid support frame in its said extended condition radially outwardly from said post member;

said closure cap member including an integral abutment member, cooperating with said support member in said cap member closed condition for preventing accidental release of said support frame from said post member; further including extension members, endwisely mounted to each of the two opposite ends of said elongated frame elements for relative movement thereabout, wherein the length of said elongated frame elements is adjustable to fit road sign panel members of various sizes and shapes.

* * * * *